(12) United States Patent
Helal et al.

(10) Patent No.: US 8,960,469 B1
(45) Date of Patent: Feb. 24, 2015

(54) STORAGE SYSTEM WITH STACKING TOTES

(75) Inventors: Hunter Dean Helal, Seattle, WA (US);
Mangesh S. Kolharkar, Bothell, WA (US); Douglas C. Bryan, Seattle, WA (US); Darryl I. Jenson, Redmond, WA (US); David H. Clark, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 208 days.

(21) Appl. No.: 12/981,000

(22) Filed: Dec. 29, 2010

(51) Int. Cl.
*B65D 21/02* (2006.01)

(52) U.S. Cl.
USPC ....... 220/23.6; 206/507; 206/508; 220/345.1; 220/23.4

(58) Field of Classification Search
CPC .... B65D 21/00; B65D 21/0209; B65D 21/04; B65D 21/043; B65D 21/045; B65D 21/046; B65D 21/0201; B65D 21/0204; B65D 21/041; B65D 25/005; A47B 87/0276; A47B 47/0025; A47B 47/0058; A47B 47/0033; A47B 47/0041; A47B 47/00; A47F 3/004
USPC ............ 206/507; 220/4.27, 23.2, 23.4, 345.1, 220/676, 601, 661
See application file for complete search history.

(56) References Cited

U.S. PATENT DOCUMENTS

| | | | | |
|---|---|---|---|---|
| 3,547,309 A | * | 12/1970 | Pusey et al. | 206/504 |
| 3,554,384 A | * | 1/1971 | DeNatale | 211/194 |
| 4,534,466 A | * | 8/1985 | Wood | 206/518 |
| 4,760,921 A | * | 8/1988 | Licari | 206/504 |
| 4,919,267 A | | 4/1990 | Stoll | |
| 4,919,268 A | * | 4/1990 | Young et al. | 206/509 |
| 5,183,278 A | * | 2/1993 | Wade, Jr. | 280/47.35 |
| 5,271,515 A | * | 12/1993 | Berkheimer et al. | 220/4.27 |
| 5,285,900 A | * | 2/1994 | Swingler | 206/508 |
| 5,447,229 A | * | 9/1995 | Lynch et al. | 206/706 |
| 5,531,517 A | * | 7/1996 | Alpen | 312/111 |
| 5,605,246 A | * | 2/1997 | Rausch et al. | 220/555 |
| 5,617,953 A | | 4/1997 | Cope | |
| 5,715,956 A | * | 2/1998 | Yoshida | 211/182 |
| 5,746,333 A | * | 5/1998 | Wuertemberger | 211/189 |
| 5,752,602 A | | 5/1998 | Ackermann et al. | |
| 5,775,046 A | * | 7/1998 | Fanger et al. | 52/590.1 |
| 5,810,187 A | * | 9/1998 | Woodring | 220/23.86 |
| 6,708,824 B2 | | 3/2004 | Sahm, III | |
| 7,258,241 B2 | * | 8/2007 | Reid | 211/113 |
| 7,311,202 B2 | * | 12/2007 | Chen | 206/504 |
| 7,588,162 B2 | * | 9/2009 | Dube et al. | 220/552 |
| 2005/0045517 A1 | * | 3/2005 | Holdsworth | 206/509 |
| 2006/0113303 A1 | * | 6/2006 | Huruta | 220/23.4 |
| 2006/0243627 A1 | * | 11/2006 | Meissen | 206/509 |
| 2007/0221719 A1 | | 9/2007 | Vroon et al. | |
| 2010/0006467 A1 | * | 1/2010 | Joseph et al. | 206/508 |

* cited by examiner

*Primary Examiner* — Anthony Stashick
*Assistant Examiner* — Mollie Llewellyn
(74) *Attorney, Agent, or Firm* — Robert C. Kowert; Meyertons, Hood, Kivlin, Kowert & Goetzel, P.C.

(57) ABSTRACT

A system for holding items includes a base tier including two or more totes and one or more higher tiers stacked on the base tier. Each of the higher tiers includes one or more totes stacked on a tote of a lower tier. Totes in of the tiers are laterally cross coupled to one another. The totes include lateral openings that allow removal of items through the lateral opening while the totes are stacked in place.

20 Claims, 12 Drawing Sheets

STORAGE SYSTEM WITH STACKING TOTES

BACKGROUND

Electronic marketplaces (e.g., Internet- or web-based marketplaces) have become legitimate alternatives to traditional "brick and mortar" retail stores. For instance, consumers may visit a merchant's website to view and/or purchase goods and services offered for sale by the merchant (and/or third party merchants). In many cases, consumers appreciate the convenience and simplicity of the shopping experience provided by electronic marketplaces. For example, a consumer may quickly browse an electronic catalog (e.g., via a web browser) and select one or more items from the catalog for purchase. Such items may be shipped directly to the consumer thereby relieving the consumer of the inconvenience of traveling to a physical store.

Some electronic marketplaces include large electronic catalogs of items offered for sale. Distributors that operate such marketplaces may process inventory of items in one or more facilities (e.g., warehouses, distributions centers, etc.). Some product sellers have facilities in only a relatively small number of locations. Shipping from the small number to myriad domestic and foreign locations of customers requires that many items be shipped long distances.

Some product sellers experience large seasonal fluctuations. For example, some retail merchants experience very high product demand during holiday seasons. These seasonal fluctuations cause spikes in facilities requirements. To meet the facilities requirements during these spikes, sellers may create and stock temporary facilities, such as a holiday fulfillment center. Such temporary facilities may, however, be expensive to equip and maintain. For example, a large amount of shelving may need to be constructed for a temporary fulfillment center. Conventional shelving may be capital intensive and labor intensive to construct, and may require significant planning, permitting, inspections, and certifications. Moreover, even where such temporary facilities can be made available, the facilities may not be in the optimal locations relative to the customer base.

Even after seasonal requirements have subsided for temporary facilities, temporary facilities and the associated equipment may consume a substantial amount of resources.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of systems and methods for storing items in totes are described. According to one embodiment, a system for holding items includes a base tier including two or more totes and one or more higher tiers stacked on the base tier. Each of the higher tiers includes one or more totes stacked on a tote of a lower tier. Totes in of the tiers are laterally cross coupled to one another. The totes include lateral openings that allow removal of items through the lateral opening while the totes are stacked in place.

According to one embodiment, a tote for holding items includes one or more item-holding portions, one or more coupling portions, and one or more lateral openings. The coupling portions can laterally couple the tote with at least one other tote. The lateral openings allow removal of items from the tote through the lateral openings.

According to one embodiment, a method of holding items includes providing one or more items in each of two or more totes. The totes include one or more lateral openings. At least two of the totes are laterally cross with one another to form a base tier of totes. Totes are stacked on the base tier totes to form at least one higher tier of totes. The totes are stacked such that the items in the totes are removable through at least one of the lateral openings.

According to one embodiment, a method of making a shelving system for storing items includes cross coupling two or totes to form a base tier of totes. The totes include one or more lateral openings. Totes are stacked on the totes in the base tier to form at least one higher tier of totes. The totes are stacked such items can be placed into the totes through the lateral openings.

As used herein, "coupled to" includes a direct connection or an indirect connection. Elements may be coupled to one another in any of various manners, including a fixed connection, pivoting connection, sliding connections, or combinations thereof.

As used herein, "cross coupled" means items are coupled to mutually inhibit separation of the items from one another.

As used herein, "interlock" includes a combination of elements, or portions thereof, that cooperate to inhibit separation of two or more component or elements from one another. In some embodiments, interlocks elements are integral to the parts being held together (for example, dovetails, grooves, lips, or protrusions). In other embodiments, interlock elements are separate parts (for example, coupling links, pins, or clips). Interlocking elements may connect in a press fit or a clearance fit. In certain embodiments, interlocking elements may snap together.

As used herein, "lateral" or "laterally" includes in a lateral direction or a generally horizontal direction. A lateral opening in a tote may be, for example, in the front side, back side, left side, or right side of the tote.

As used herein, a "pin" includes any element that can be positioned to constrain or hold another element in a desired position or orientation. Suitable pins may include straight pins, pegs, threaded bolts, unthreaded bolts, bars, plates, hooks, rods, or screws.

As used herein, "shelving" includes any system, element, or combination thereof that has one or more shelves, platforms, or other surfaces for holding items.

As used herein, a "space" means a space, area or volume.

As used herein, "tier" means a row or layer of one or more objects. A tier may be part of an arrangement or assembly of objects. Objects in one tier may be above or below items in one or more other tiers of objects within an arrangement. For example, a stack of totes may include a bottom tier and one or more higher tiers above the bottom tier.

As used herein, "tote" means a bin, crate, box, or other container in which or on which one or more items can be placed. A tote may be open on or more of its sides. In various embodiments, a tote can be used for storage, transportation, display, or environmental protection. A tote may be any shape or size.

Figure 1:
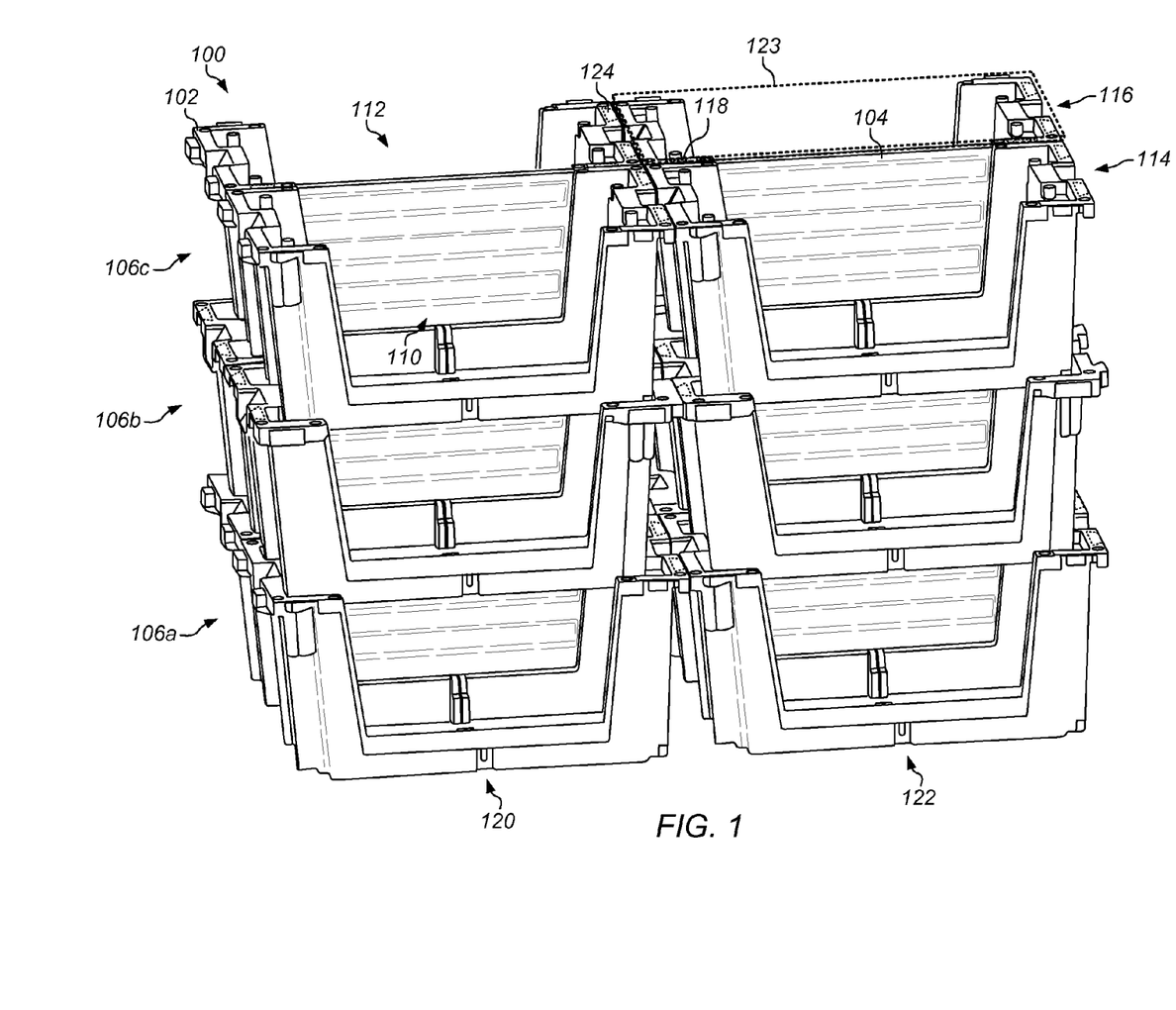
FIG. 1 illustrates one embodiment of a system for holding items that include cross coupled totes.

In some embodiments, two or more totes are connected with one another to create shelving for holding items. FIG. 1 illustrates one embodiment of a system for holding items that include cross coupled totes. System 100 includes totes 102 and removable walls 104. Items such as books, CDs, or DVDs may be held in each of totes 102. Totes 102 are stacked on one another to form columns and arranged next to one another to form rows. Totes 102 are arranged in tiers 106A, 106B, and 106C.

Removable walls 104 physically separate contents in the front columns of totes 102 from the contents in the back columns of totes 102. Each of totes 102 includes front opening 110 and back opening 112. Front openings 110 and back openings 112 may allow contents in totes 102 to be removed from the totes. For example, in the arrangement shown in FIG. 1, front openings 110 may allow contents to be removed from the front of totes 102 on the front side of system 100. Back openings 112 may allow contents to be removed through the back of totes 102 on the back side of system 100.

In the embodiment illustrated in FIG. 1, system 100 is two totes wide (side to side) by two totes deep (front to back) by three totes high. Nevertheless, a shelf system may, in various embodiments, be any number of totes wide, deep, or high. In one embodiment, a shelf system is eight totes wide, two totes deep, and seven totes high. The width of a tote system may be, in one embodiment, about 16 feet.

Within each of tiers 106A, 106B, and 106C, totes 102 may be cross coupled front-to-back and side-to-side. For example, in tier 106C shown in FIG. 1, totes 102 in front columns 114 couple with the adjacent totes 102 in rear columns 116 at interlocks 118, and totes 102 on left columns 120 couple with totes 102 on right columns 122 at interlocks 124.

Although in the embodiment shown in FIG. 1, totes in a system are coupled in two directions (front-to-back and side-to-side), in certain embodiments, totes in a system may be cross coupled in only one direction (for example, side-to-side only, or front-to-back only).

Totes may be used to store any items. Examples of items that can be stored in a tote include books, CDs, DVDs, software media, jewelry, apparel (for example, men's dress shirts), shoes, hardware, office supplies, or household items.

Figure 2:
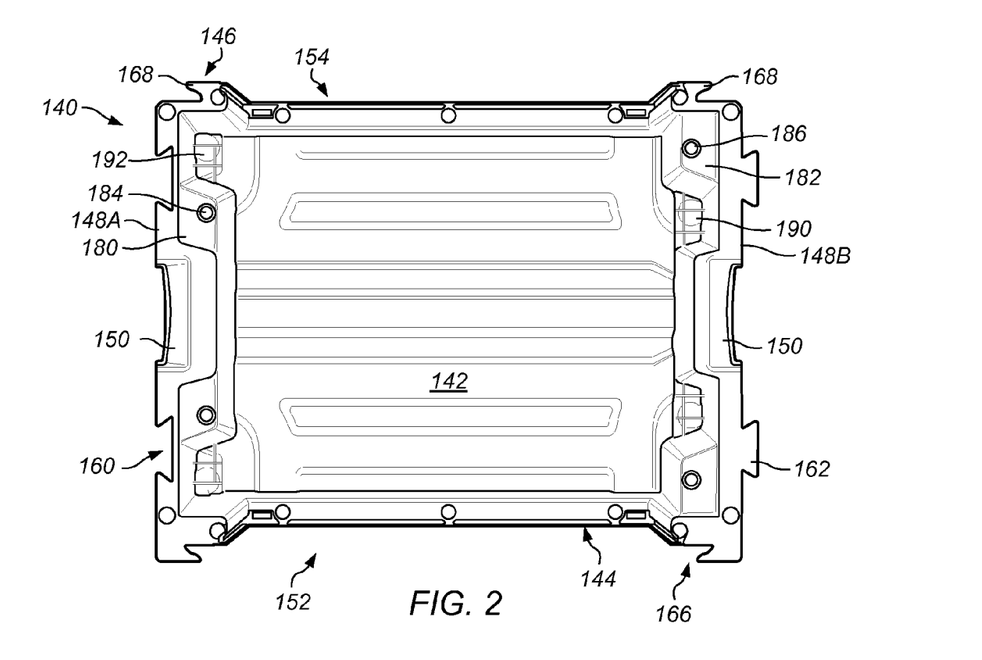
FIG. 2 is a top view illustrating one embodiment of a tote that can be used as modular elements for a shelving system.

FIG. 2 is a top view illustrating one embodiment of a tote that can be used as a modular element for a shelving system. Tote 140 includes bottom panel 142, front panel 144, back panel 146, and side panels 148A and 148B. Side panels 148A and 148B include handles 150. Front panel 144 includes front opening 152. Back panel 146 includes back opening 154.

Bottom panel 142 includes corrugations 155. Corrugations 155 may increase the load bearing capacity of tote 140 and/or increase rigidity of bottom panel 142 when items are placed in tote 140.

In some embodiments, a tote includes cross coupling portions. The cross coupling portions can be used, for example, to couple with other totes within a tier of a storage system. In some embodiments, coupling portions are used to interlock one tote with another. In FIG. 2, for example, tote 140 includes dovetail interlock elements. Side panel 148A includes side interlock sockets 160. Side panel 148B includes side interlock tails 162. Front panel 144 includes front interlock socket 166. Front interlock socket 166 is split by front opening 152. Back panel 146 includes back interlock tail 168. Back interlock tail 168 is split by back opening 154.

Figure 3:
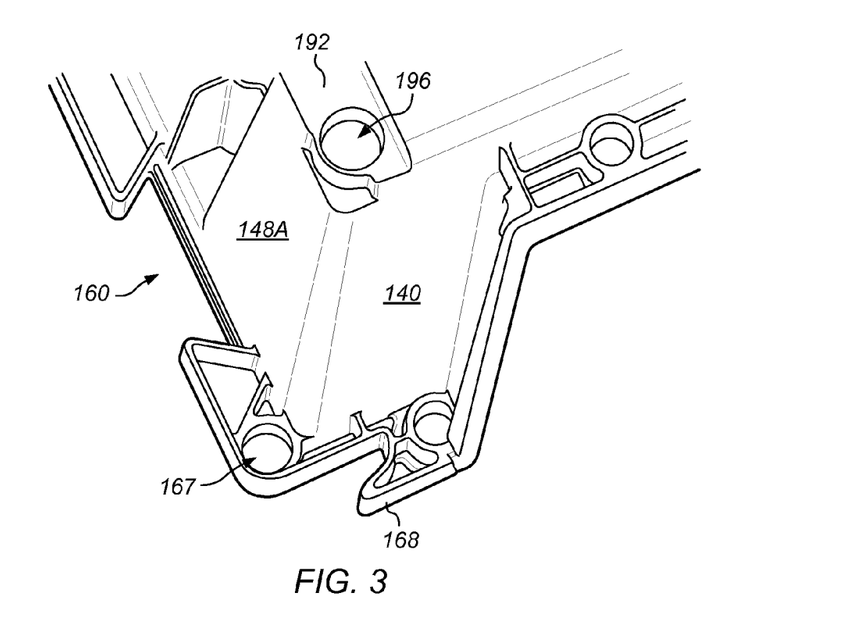
FIG. 3 is a bottom view illustrating a corner of a tote having a side interlock socket and a split back interlock tail.

FIG. 3 is a bottom view illustrating a corner of a tote having a side interlock socket and a split back interlock tail. Tote 140 includes side interlock socket 160 and back interlock tail 168.

Figure 4:
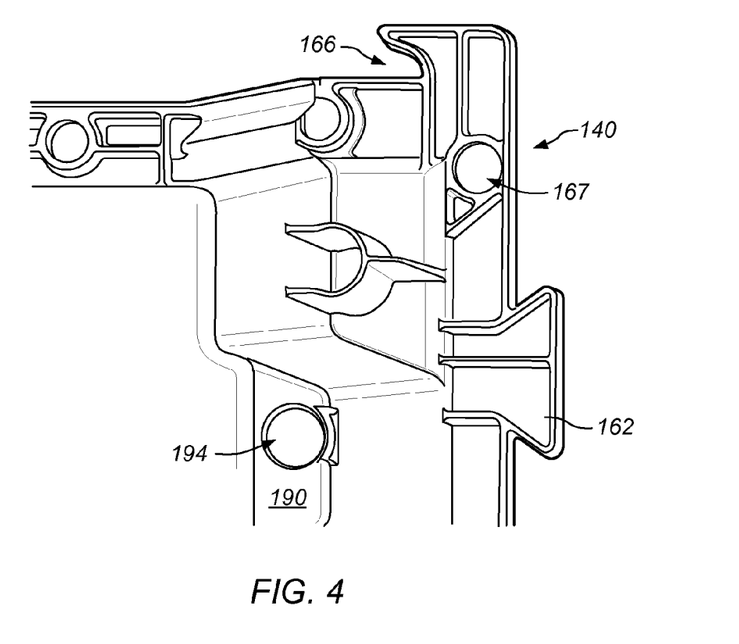
FIG. 4 is a bottom view illustrating a corner of a tote having a side interlock tail and a split front interlock socket.

FIG. 4 is a bottom view illustrating a corner of a tote having a side interlock tail and a split front interlock socket. Tote 140 includes side interlock tail 162 and front interlock socket 166.

Figure 5:
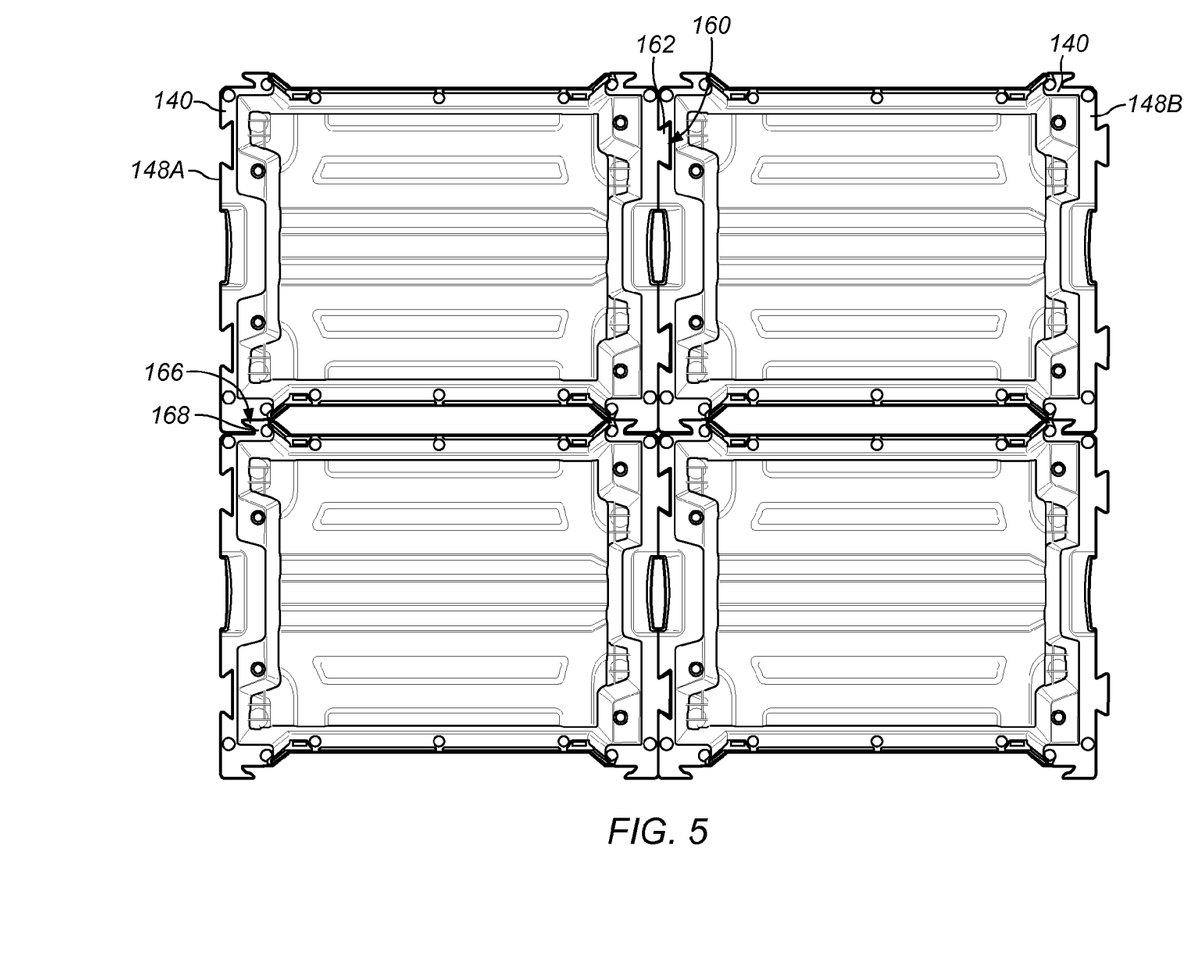
FIG. 5 illustrates one embodiment of a system having totes that are cross coupled in the front-to-back direction and in the side-to-side direction.

FIG. 5 illustrates one embodiment of a system having totes that are cross coupled in the front-to-back direction and in the side-to-side direction. Side interlock sockets 160 of totes 140 may interlock with interlock tails of an adjacent tote to cross couple side panel 148A of totes 140 with the side of the adjacent tote. Side interlock tails 162 of totes 140 may interlock with side interlock sockets on an adjacent tote to cross couple side panel 148B of totes 140 with the adjacent tote.

Front interlock socket 166 of totes 140 may interlock with a back interlock tail on an adjacent tote to couple front panel 144 of tote 140 with the back of the adjacent tote. Back interlock tail 168 of totes 140 may interlock with a front interlock socket on an adjacent tote to couple back panel 144 of tote 140 with the front of the adjacent tote.

Figure 6:
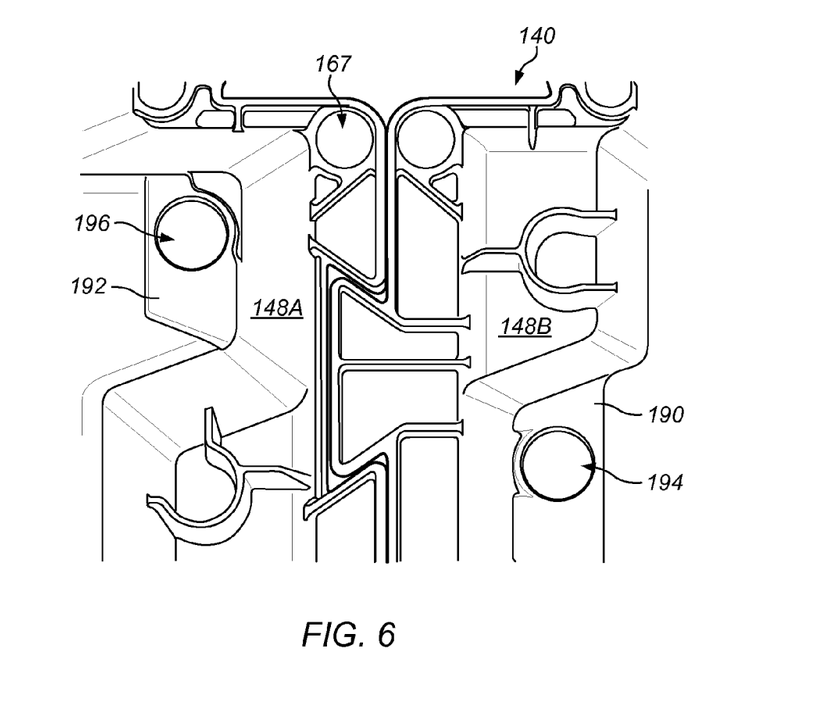
FIG. 6 is a bottom view illustrating a side interlock connection between two adjoining totes.

FIG. 6 is a bottom view illustrating a side interlock connection between two adjoining totes. Side interlock tail 162 and side interlock socket 160 interlock to couple side panel 148A of one of totes 140 with side panel 148B of another one of totes 140.

Figure 7:
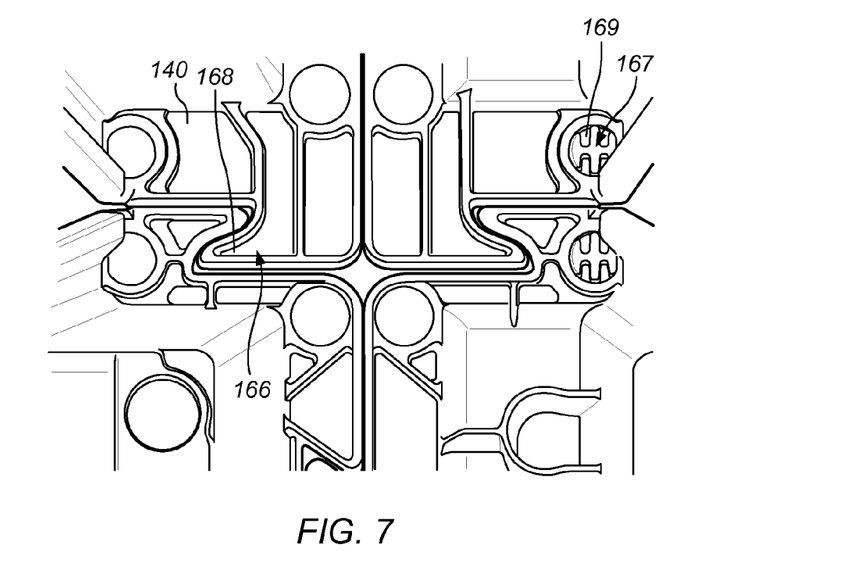
FIG. 7 is a bottom view illustrating a corner interlock connection of four totes.

FIG. 7 is a bottom view illustrating a corner interlock connection of four totes. Front interlock tail 168 of one of totes 140 interlocks with back interlock tail 166 of another one of totes 140 to couple the totes front-to-back.

In some embodiments, totes are stackable such that one tote can be placed on top of another in a manner that maintains all or most of the storage capacity within each tote. In the embodiment shown in FIGS. 2 and 5, side panel 148A of tote 140 includes central shelf 180. Side panel 148B of tote 140 includes corner shelves 182. One of corner shelves 182 is provided in each corner on side panel 148B. Central shelf 180 includes central alignment posts 184. Corner shelves 182 include corner alignment posts 186.

Tote 140 includes central pads 190 adjoining side panel 148B and corner pads 192 adjoining side panel 148A. As shown in FIGS. 3, 4, and 6, central pads 190 include central alignment sockets 194. Corner pads 192 include corner alignment sockets 196.

Totes 140 may be stacked in an alternating orientation, such that each tote is rotated in a horizontal plane 180 degrees relative to the tote it is stacked upon. Thus, when totes 140 are stacked on top of another, central pad 190 on side panel 148B of each of totes 140 may rest on central shelf 180 on side panel 148A of the tote immediately below. Each of corner pads 192 on side panel 148A may rest on one of corner shelves 182 on side panel 148B of the tote immediately below. With each additional tier, the orientation of the totes may be reversed such that, for any given tote, side panel 148A is resting on side panel 148B of the tote below and side panel 148B is resting on side panel 148A of the tote below.

When totes 140 are stacked on top of another, each of corner alignment sockets 196 on side panel 148B of one tier of totes 140 may align with and receive one of corner alignment posts 186 on side panel 148A of the tier of totes 140 immediately below it. Each of central alignment sockets 194 on side panel 148A of the lower tier of totes 140 may align with and receive one of central alignment posts 184 on side panel 148B of the tier of totes 140 immediately below it. Engagement of alignment sockets on alignment posts of a lower tier of totes may maintain the totes in a stacked relationship with one another.

Figure 8:
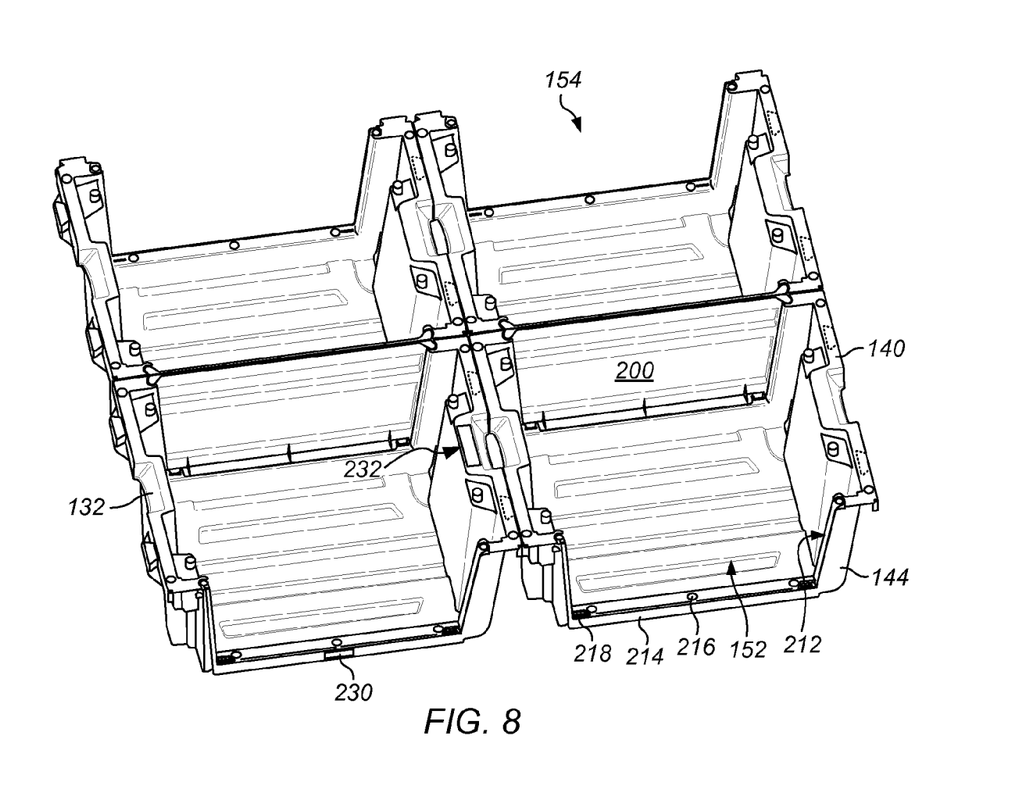
FIG. 8 illustrates an embodiment of one tier of a tote system including interlocking totes and removable panels.
Figure 9:
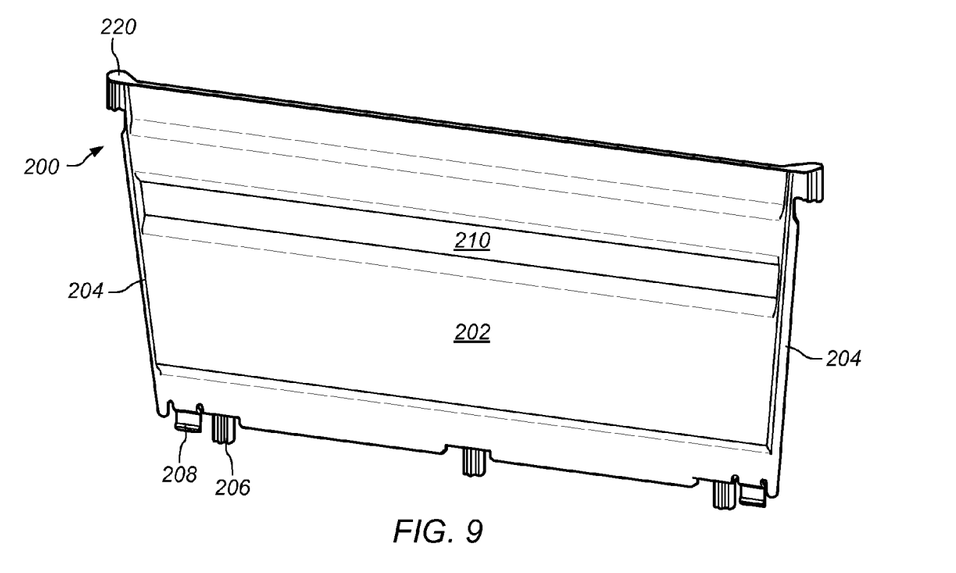
FIG. 9 illustrates one embodiment of a removable panel for a tote.

In some embodiments, a tote includes one or more removable panels. Removable panels may provide protection for, and/or retain, items in a tote. Removable panels may provide lateral access to the contents of a tote. FIG. 8 illustrates an embodiment of one tier of a tote system including interlocking totes and removable panels. FIG. 9 illustrates one embodiment of a removable panel for a tote. In some embodiments, a removable panel may be used, for example, to fill front opening 152 or back opening 154 of tote 140 shown in FIG. 8. Removable panel 200 includes wall 202, rails 204, pins 206, and latching tabs 208. Wall 202 includes corrugations 210. To install removable panel 200 in front panel 144 of tote 140, rails 204 may be engaged in guides 212 in the sides of front opening 152. Removable panel 200 may be advanced downwardly on slots 212 until removable panels 200 bottom out on lower lip 214 of front panel 144 shown in FIG. 8. Pins 206 on the leading edge of removable panel 200 may engage in sockets 216 of front panel 144. At the same time, posts 220 at the top of rails 204 may become flush with the top of front panel 144. Latching tabs 208 of removable panel 200 may pass through slots 218 in front panel 144 of tote 140. Latching tabs 208 may resiliently latch in slots 218.

A tote in a shelving system may have any shape and size. The dimensions may be based, for example, on the items to be stored in the totes. In one embodiment, tote 140 is at least about 12 inches in depth. In one embodiment, front opening 152 and back opening 154 are about 9.5 inches high, about 19.75 inches wide at the top of the opening, and about 17.75 inches wide at the bottom of the opening.

System 100 includes bin label 230. Bin label 230 may be used as an identifier for the system of totes. Each of totes 140 may include one of tote labels 232. Each of tote labels 232 may be used as an identifier for the particular tote on which it is placed. In certain embodiments, multiple bin identifiers may be assigned to each tote in a system of totes. In one embodiment, up to two bin identifiers can be assigned to each tote. One of the assigned bin identifiers may be placed on one side of a divider for the tote and the other assigned bin identifier can be placed on the other side of the divider. The bin identifiers can be changed manually if the location of the tote in the fulfillment center changes. In another embodiment, one of the assigned bin identifiers is placed on one side of the tote and the other assigned bin identifier is placed on another side of the tote (for example, the opposite side of the tote).

Figure 10:
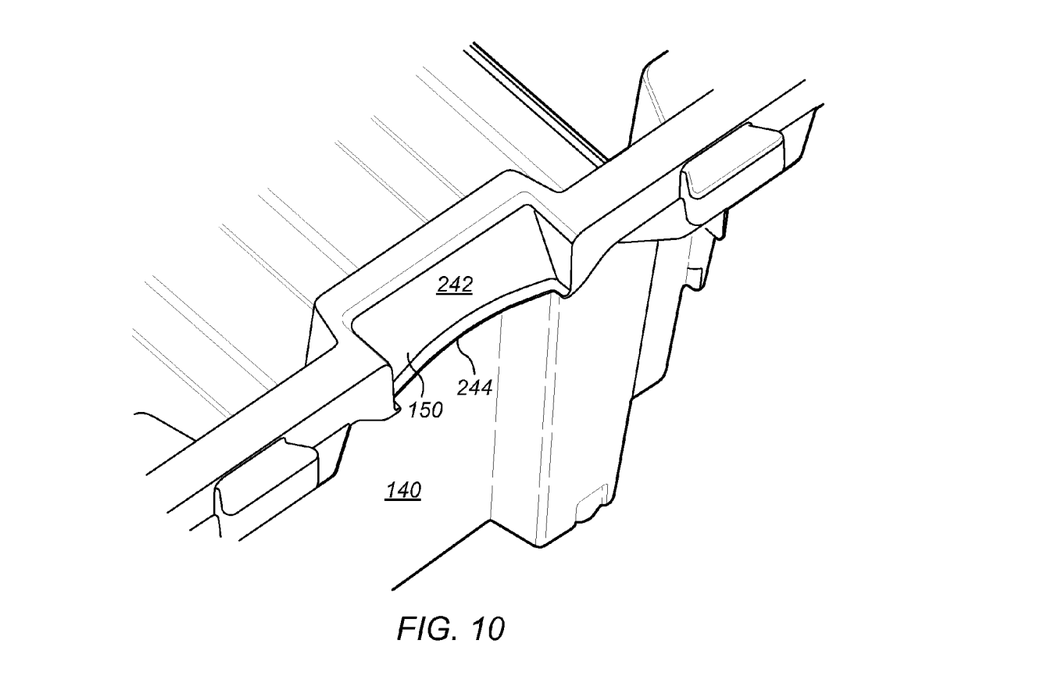
FIG. 10 illustrates one embodiment of a handle for a tote.

FIG. 10 illustrates one embodiment of a handle for a tote. Handle 150 includes grip 242. Grip 242 includes concave edge 244. Concave edge 244 may create an opening to allow handle 150 to be used when totes 140 are coupled with one another (such as the opening shown between totes in FIG. 8).

Figure 11:
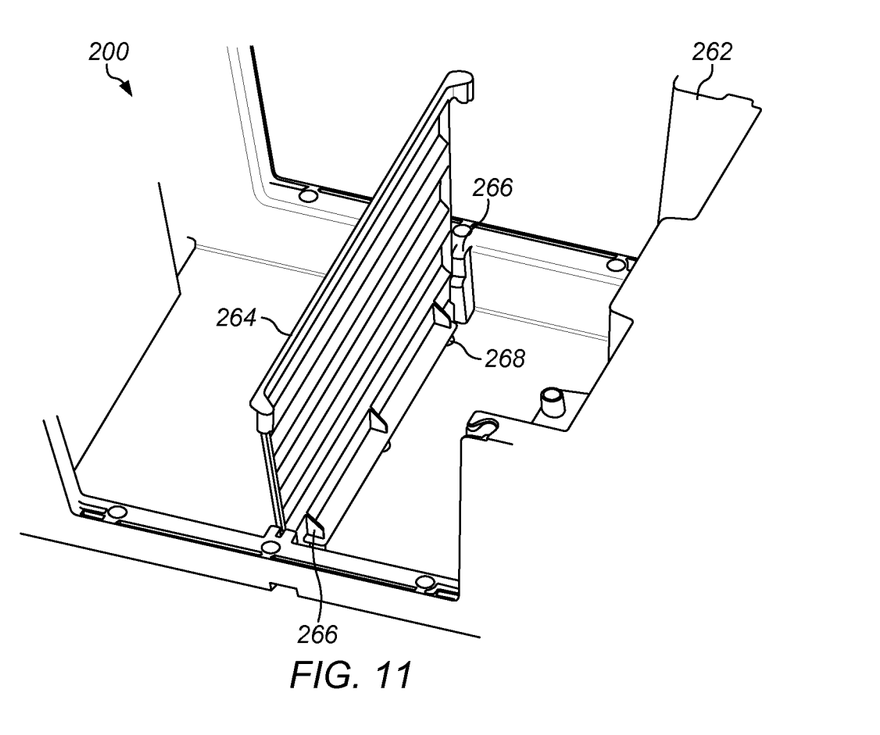
FIG. 11 illustrates an embodiment of a tote system including a divider.

In some embodiments, a tote system includes one or more dividers. The dividers may subdivide the space in a tote into two or more segments. FIG. 11 illustrates an embodiment of a tote system including a divider. Tote system 260 includes tote 262 and divider 264. Divider 264 may couple with tote 262 in receptacles 266. Pins 268 may engage in holes corresponding holes in tote 262. Divider 264 may create left and right volumes for holding items in totes 262. In some embodiments, latching tabs on divider 264 may snap into slots in tote 262, similar to that shown and described above for removable panels 200 relative to FIG. 9 and FIG. 10. Engagement of latching tabs in the slots may serve to retain divider 264 in tote 262. In some embodiments, a tote is dimensioned so that a common part can be used as either a divider or a removable wall. For example, both receptacles 266 and the front and rear openings of tote 262 may receive divider 264. A system that allows a removed wall to be installed as a divider may help keep removed walls from being lost or separated from their respective totes.

In some embodiments, totes in a system are nestable such that one tote can be placed on top of another in a compact manner. Totes may be nested, for example, when shelving systems are not needed for storing items (for example, during non-holiday seasons).

Figure 12:
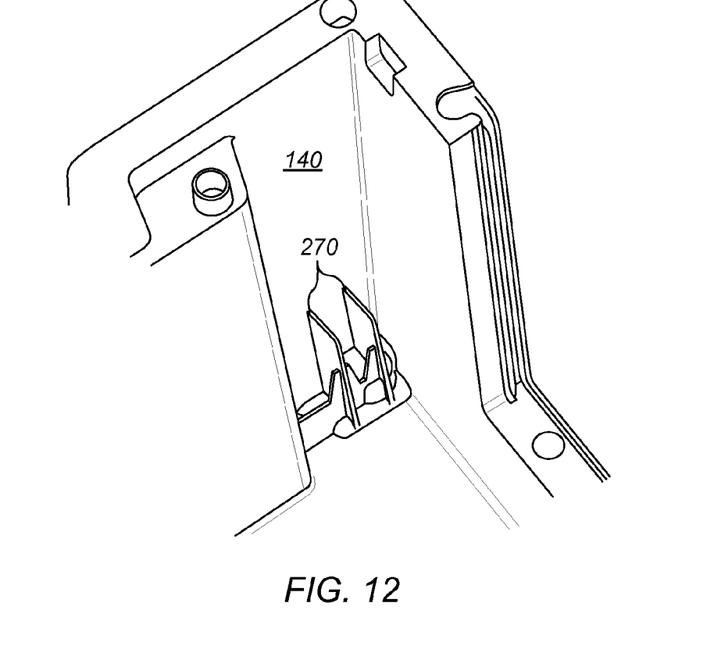
FIG. 12 illustrates a tote including stop elements for nesting totes.

In some embodiments, a tote includes stop elements. Stop elements may stop a tote being nested at a desired level. For example, stop elements may keep nested totes from becoming jammed together. FIG. 12 illustrates a tote including stop elements. Tote 140 includes nesting overload ribs 270. Pads of a tote nested in tote 140 may bottom out on nesting overload ribs 270.

Figure 13:
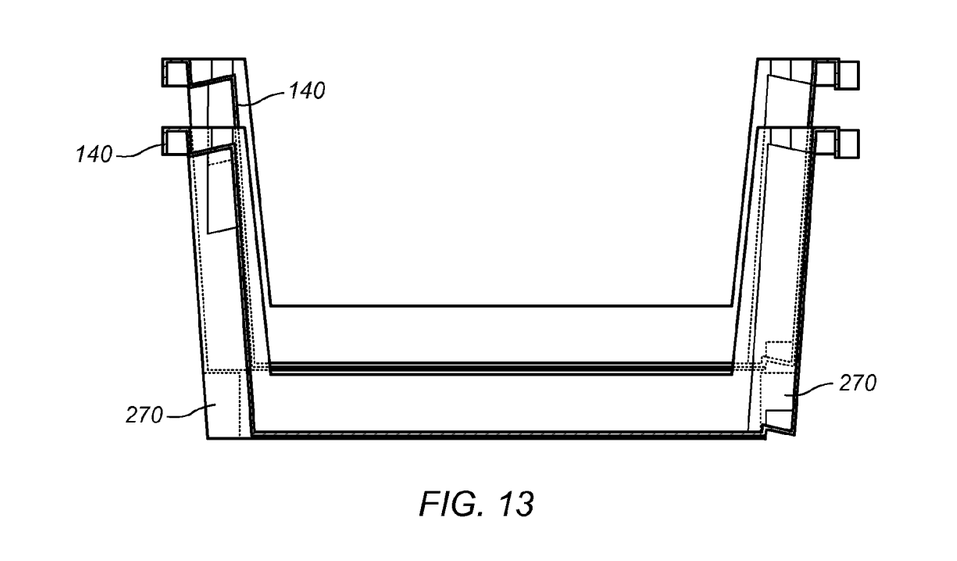
FIG. 13 is a cross sectional view of two totes in a nested relationship.

FIG. 13 is a cross sectional view of two totes in a nested relationship. The upper one of totes 140 is bottomed out on nesting overload ribs 270 of the lower one of the totes.

In some embodiments, totes are made to be selectively nested or stacked based on the orientation of the totes relative to one another. For example, for totes 140 shown in FIG. 8, when totes 140 are placed one on another such that sides 148A are aligned with one another and sides 148B are aligned, totes 140 may nest, for example, in the manner shown in FIG. 13. By contrast, when totes 140 are placed one on another such that sides 148A and side panels 148B alternate, totes 140 may stack, for example, in the manner shown in FIG. 1.

Figure 14:
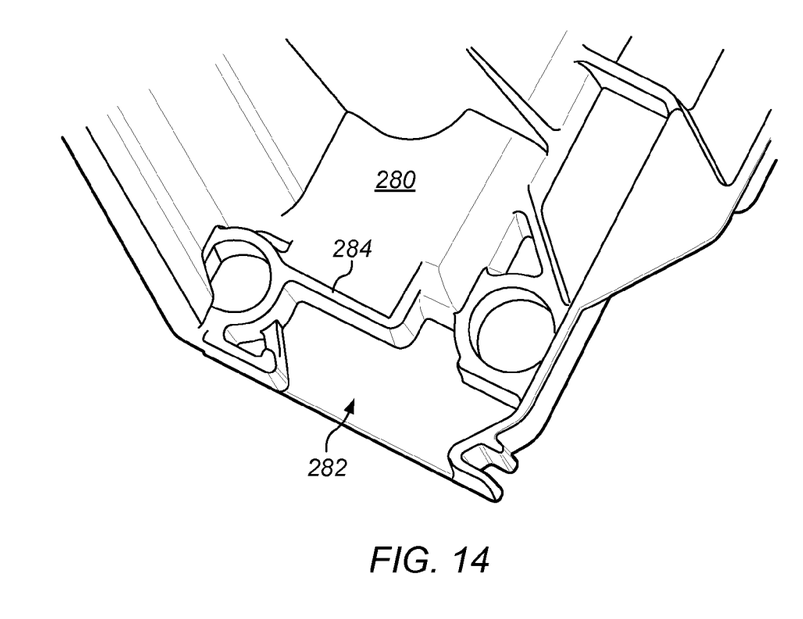
FIGS. 14 and 15 are bottom views illustrating elements of a blind dovetail connection.
Figure 15:
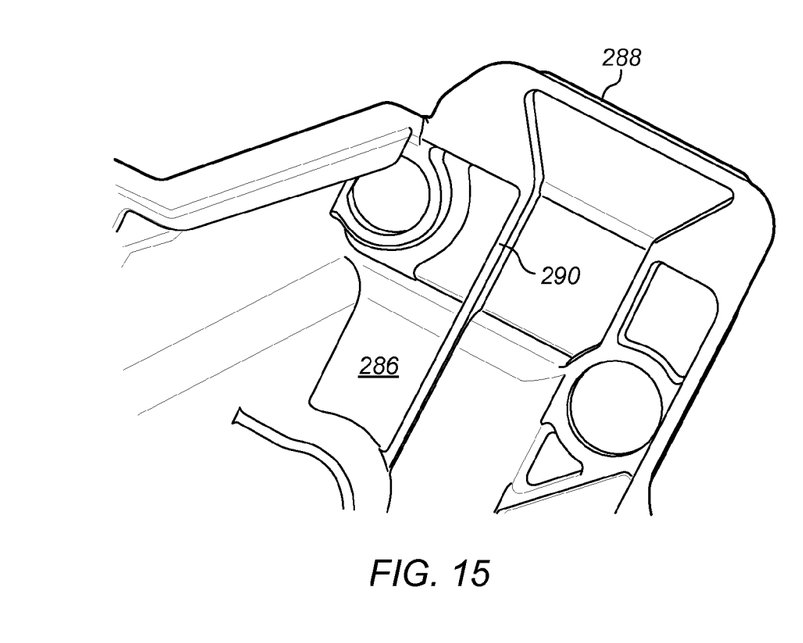

In some embodiments, a dovetail connection may be a blind connection. FIGS. 14 and 15 are bottom views illustrating elements of a blind dovetail connection. Tote 280 includes blind dovetail socket 282 and reinforcing webs 284. Tote 286 includes tail 288 and reinforcing webs 290. Tail 288 of tote 286 may couple in blind dovetail socket 282 of tote 280. Reinforcing webs 284 and 290 may reduce stress at the dovetail connection.

In the embodiments shown in FIGS. 5, 14, and 15, totes are cross coupled by way of dovetail connections. Totes in a shelving system may, however, be cross coupled in various embodiments by any other coupling arrangement. Examples of coupling arrangements include pin-and-socket, snap-in connections, and hooks and grooves.

Figure 16:
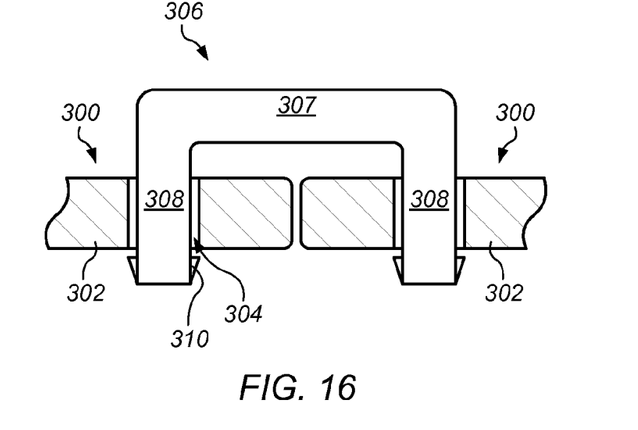
FIG. 16 illustrates a U-shaped coupler for cross coupling totes.

In some embodiments, a separate coupling device is used to couple adjacent totes to one another. FIG. 16 illustrates a U-shaped coupler for cross coupling totes. Totes 300 include rims 302. Rims 302 include through holes 304. Coupler 306 include cross bar 307 and pins 308, which combine to form a U-shape. Each of pins 308 of coupler 306 may pass through one of through holes 304 in totes 302. Protrusions 310 of pins 308 may catch on the underside of rims 302 of totes 300. Pins 308 may snap into engagement on totes 300.

In certain embodiments, separate couplers are used to supplement, or in lieu of, integral coupling portions on totes. For example, as shown in FIGS. 3, 6, and 7, totes 140 include holes 167. Couplers may be inserted into various combinations of holes 167 in adjacent totes to cross couple the totes. For example, as shown in FIG. 7, coupler 169 may be used to cross couple adjacent totes 140.

Figure 17:
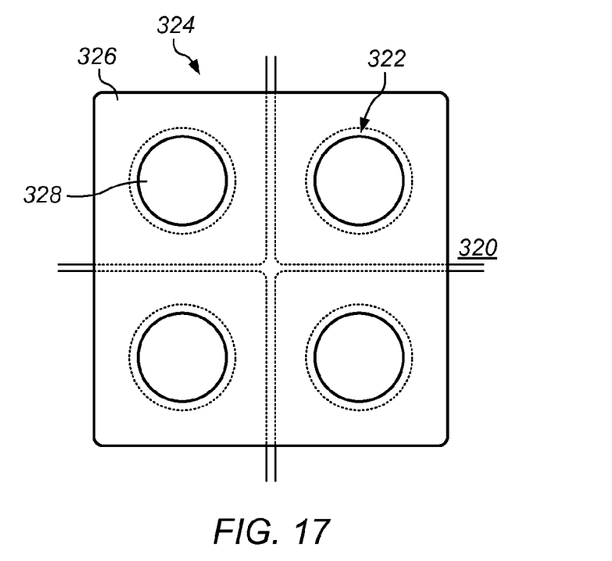
FIG. 17 illustrates a device for cross coupling four totes at a common intersection of the totes.

In some embodiments, totes are cross coupled at an intersection of the corners of a set of totes. FIG. 17 illustrates a device for cross coupling four totes at a common intersection of the totes. Totes 320 include holes 322. Coupling device 324 includes plate 326 and pins 328. One of pins 328 of coupling device 324 may be received into each of holes 322 of totes 320. Coupling device 324 may couple all of totes 320 to one another.

Figure 18:
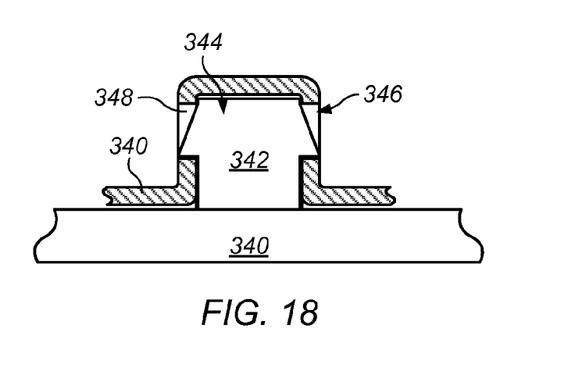
FIG. 18 illustrates one embodiment of a snap-in connection between stacked totes.

In some embodiments, totes in a stack may be coupled to inhibit vertical separation of the upper and lower totes. Examples of coupling arrangement include snap-in elements on dedicated fasteners such as clips or screws. FIG. 18 illustrates one embodiment of a snap-in connection between stacked totes. The lower of totes 340 includes pin 342. The upper of totes 340 includes socket 344. Socket 344 includes slots 346. Protrusions 348 may snap into slots 346. Engagement of pins 342 of the lower one of totes 340 in socket in the upper one of totes 340 may inhibit separation of totes 340 when stacked. In some embodiments, a shelving system is coupled to inhibit separation in vertical and horizontal directions. For example, a shelving system may include horizontal cross coupling as described in FIG. 1 and vertical cross coupling as described in FIG. 18.

In some embodiments, the pin and socket relationship between totes may be reversed from that shown in FIG. 18 such that the pin is on the upper one of the adjoining totes and the socket is on the lower one of the adjoining totes.

Although the totes described above relative to FIGS. 1-10 are depicted as having a rectangular footprint, totes for a shelving system may be, in various embodiments, any shape. Suitable shapes may include round, hexagonal, octagonal, triangular, or irregular. Different totes within a shelving system may be all the same size or different sizes.

In some embodiments, a tote system may include a pallet for supporting and/or transporting stacks of totes. In some embodiments, a single pallet runs the entire width and depth of a shelving system (for example, 16 feet wide by 3 feet deep). A pallet may include stiffening elements (for example stiffening ribs) and/or mounting portions for moving the system (for example, for moving the system with a forklift or crane.)

In some embodiments, a tote system includes a pallet with modular sections. Each modular section may support part of the totes in a shelving system. For example, in a shelving system that is 2 totes deep by 8 totes long, a pallet may include 4 pallet modular sections, each of which supports a 2 by 2 stack of totes. The modular sections of the pallet may include coupling elements for connecting the modular sections to one another. For example, the modular sections of the pallet may include dovetail elements similar to those in totes 140 described above relative to FIG. 2.

In certain embodiments, a pallet includes elements for aligning stacks of totes on the pallet. The alignment elements may be arranged to correspond to alignment elements on the totes. For example, a pallet for totes 140 shown in FIG. 2 may include posts that correspond to alignment sockets 194 and 196 described above relative to FIGS. 2, 3, 4, and 6. In certain embodiments, a pallet may include elements for coupling the totes on the pallet. In one embodiment, a pallet includes elements for snapping totes in place on the pallet.

In some embodiments, a shelving system of totes includes lids. In some embodiments, lids are provided for totes in the uppermost tier of a system. For example, a lid 123 may be provided on each of totes 102 in tier 106C shown in FIG. 1. Lids may keep unwanted materials out of a system. In some embodiments, lids on the top tier of totes in a system keep water (such as from building sprinkler system) from entering a totes in a system.

A tote for a shelving system, or portions thereof, may be produced by various manufacturing processes, including molding, casting, machining, extruding, forming, or cutting. In one embodiment, an air directing device is injection molded. Suitable materials for a tote may include a polymer or a metal. In certain embodiments, a tote is made of a fire-retardant polymeric material. In some embodiments, a tote is produced as a single part, such as by molding, forming, or machining. In other embodiments, an air directing device is an assembly of two or more parts.

In various embodiments, a shelving system including stacked totes is used for storing items in a materials handling facility. A materials handling facility may include, for example, one or more facilities that process, store, and/or distribute units of items including but not limited to warehouses, distribution centers, hubs, fulfillment centers, nodes in a supply chain network, retail establishments, shipping facilities, stock storage facilities, or any other facility configured to process units of items.

In some embodiments, stacked totes are used to construct shelving to create or expand capacity for inventory. The capacity may be used, for example, to quickly fulfill a temporary or transient need for additional capacity, such as during a holiday season. After the need for additional capacity has passed, the totes may be unstacked and removed from their deployed location. In one embodiment, a shelving system constructed from totes is used at a holiday fulfillment center. A holiday fulfillment center may be in a warehouse, tent, pole barn, or any other suitable building or location. After the holiday season is over, the totes may be removed and the location vacated or re-configured for a different purpose.

Figure 19:
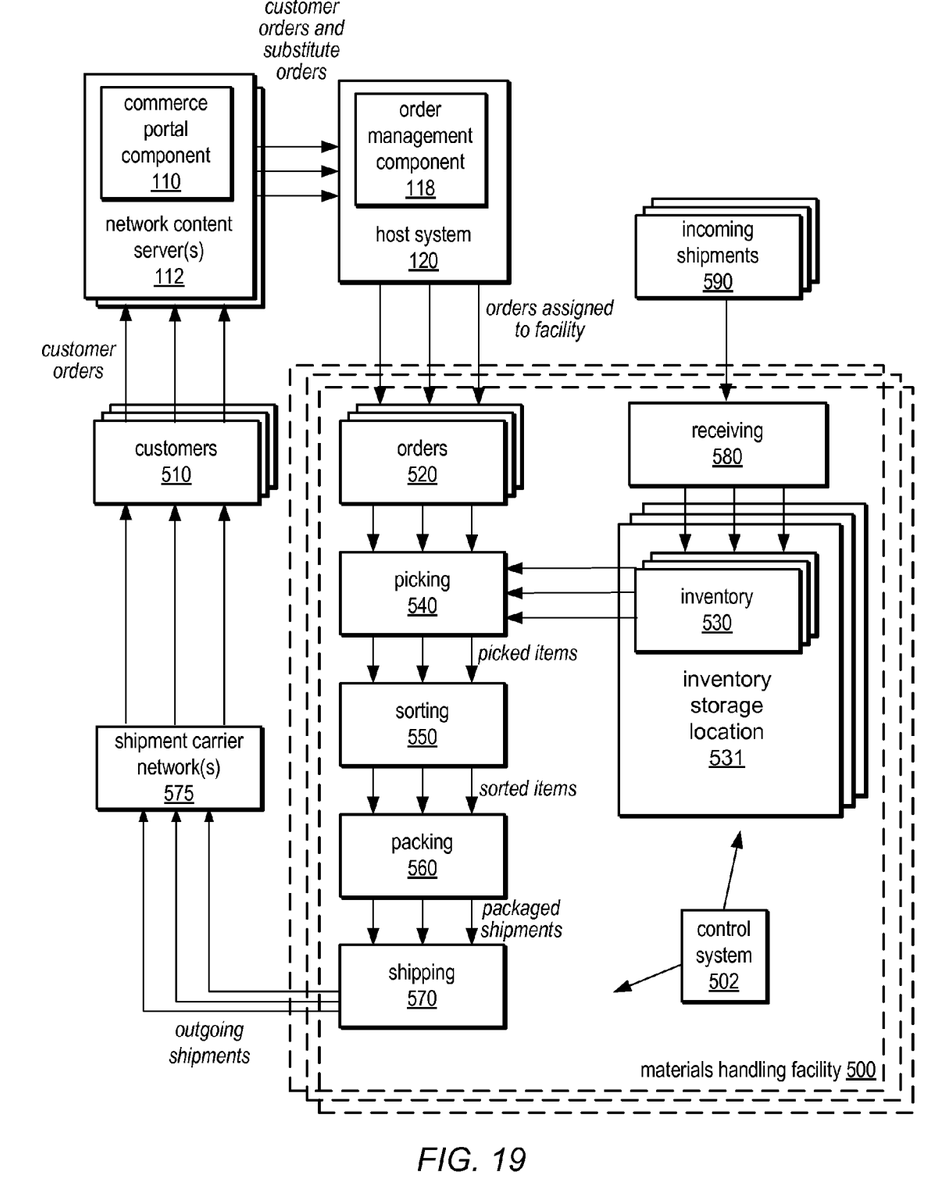
FIG. 19 illustrates operation of a materials handling facility that includes one or more inventory storage locations.

FIG. 19 illustrates a logical representation or view of the operation of one or more materials handling facilities that include one or more inventory storage locations. Some or all of the inventory storage locations may include shelving systems constructed from stacked totes, such as described above relative FIG. 1. In various embodiments, a fulfillment network including multiple materials handling facilities (each of which may be configured in a manner similar to that of materials handling facility 500) may be responsible for fulfilling multiple orders, such as orders placed through an electronic commerce ("e-commerce") portal, such as commerce portal component 110.

In various embodiments, a materials handling facility may include one or more facilities that process, store, and/or distribute units of items including but not limited to warehouses, distribution centers, hubs, fulfillment centers, nodes in a supply chain network, retail establishments, shipping facilities, stock storage facilities, or any other facility configured to process units of items. For example, this FIG. 19 may illustrate an order fulfillment center of a product distributor, according to some embodiments.

Material handling facility 500 may include one or more inventory storage locations 531 that each hold inventory 530. In one embodiment, some of inventory storage locations 531 are permanent storage locations and others of inventory storage locations are expansion locations, such a tent or pole barn for a holiday fulfillment center. The expansion locations may be outfitted with shelving systems constructed from stacked totes, such as described above relative to FIGS. 1-10. In certain embodiments, all of inventory storage locations 531 of a material handling facility 500 are constructed from stacked totes.

In some embodiments, a supplier ships inventory items (such as books and CDs) to inventory storage locations 531 with the items pre-loaded in totes. The supplier-loaded totes may be stacked at inventory storage locations 531. In some embodiments, stacks of totes pre-loaded with inventory items are shipped (for example, on a pallet) to storage locations 531.

Multiple customers 510 may submit orders to commerce portal component 110 (which may be implemented on one or more network content servers 112), where each order specifies one or more items from inventory 530 to be shipped to the customer that submitted the order. The customer orders may be provided to order management component 118, which as described above may assign such orders to a materials handling facility (e.g., a fulfillment center), as illustrated as orders 520. As described above, in various embodiments, the merchant may determine when a customer selects a substitute item for acquisition (e.g., after the customer is provided with an order status message that recommends one or more items). In these cases, commerce portal component 110 may also provide order management component 118 with substitute orders that specify any substitute items specified by the customer. The order management component may assign any of the above-described orders to a materials handling facility in order to initiate fulfillment of the orders. In the illustrated embodiments, the orders assigned to materials handling facility 500 are illustrated as orders 520.

To fulfill the orders 520, the one or more items specified in each order may be retrieved, or picked, from inventory 530 (in the materials handling facility, as indicated at 540. In some embodiments, the items are picked from lateral openings in stacked totes, such as the totes described above relative to FIGS. 1-10.

Picked items may be delivered or conveyed, if necessary, to one or more stations in the materials handling facility for sorting 550 into their respective orders, packing 560, and finally shipping 570 to the customers 510. In various embodiments, picked items may be delivered to a station where individual units of items are associated with and placed into particular conveyance receptacles, which are then inducted into a conveyance mechanism. The conveyance receptacles may then be routed to particular destinations for the items contained within the receptacles in accordance with the requests (orders) currently being processed, e.g. to sorting stations, under direction of a control system (e.g., control system 502). A picked, packed and shipped order does not necessarily include all of the items ordered by the customer; an outgoing shipment to a customer may include only a subset of the ordered items available to ship at one time from an inventory storage location.

A materials handling facility may also include a receiving 580 operation for receiving shipments of stock (e.g., units of inventory items) from one or more sources (e.g., vendors) and for moving or "stowing" the received stock into stock storage (e.g., inventory 530). In some embodiments, items are received in totes. In some embodiments, inventory storage locations and/or shelving systems within existing inventory storage locations are expanded to accommodate shipments of stock.

As described above, when incoming shipments are delayed or canceled by the vendor, exceptions may occur for customer orders relying on such items. In various embodiments, the receiving 580 operation may also receive and process returned purchased or rented items or orders from customers. At least some of these items are typically returned to inventory 530.

The various operations of a materials handling facility may be located in one building or facility, or alternatively may be spread or subdivided across two or more buildings or facilities. In various instances, it should be understood that references to elements, units, items, processes (or anything else) as being located within materials handling facility 500 may easily be extended to encompass elements, units, items, processes (or anything else) proximate to but not physically located within materials handling facility. For example, various elements, units, items, or processes (or anything else) may be implemented outside of the materials handling facility, according to some embodiments.

In various embodiments, shipments of one or more items at shipping 570 may be transferred to one or more shipment carrier network(s) 575. Each shipment carrier's network may include one or more distribution facilities for storing items (e.g., hubs) as well as vehicles for conveying shipments (e.g., trucks) from such distribution facilities and/or materials handling facilities (such as materials handling facility 500) to various destinations (e.g., customer specified destinations).

Figure 20:
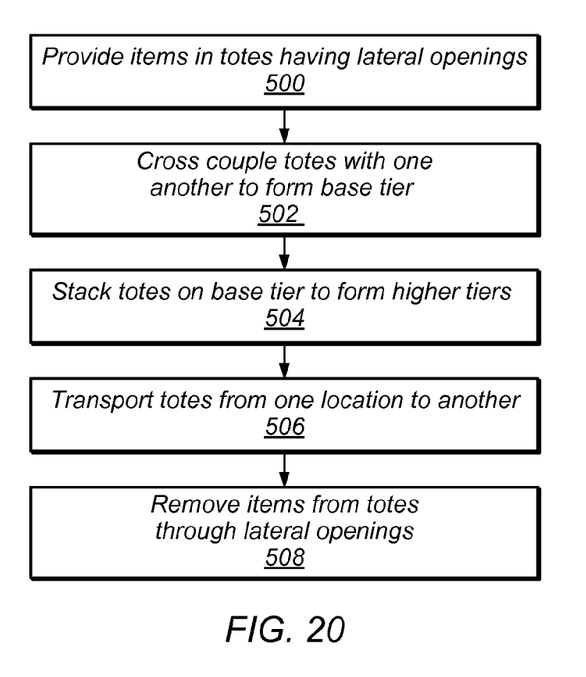
FIG. 20 illustrates one embodiment of holding items in stacked totes.

In some embodiments, a method of storing items (for example, in the inventory of a merchant) includes holding items in stacked totes. FIG. 20 illustrates one embodiment of holding items in stacked totes. At 500, items are provided in totes. Totes may be filled by a merchant, supplier for the merchant, or another party.

At 502, at least some of the totes least two of the totes are cross coupled with one another to form a base tier of totes. At 504, totes are stacked on the base tier totes to form at least one higher tier. The totes may be stacked such that the items in the totes are removable through lateral openings (for example, a front opening or a back opening) in the totes. In some embodiments, the totes are stacked at a temporary inventory storage location in response to identifying a requirement to expand a merchant's or distributor's inventory storage (for example, to handle increased orders during a holiday season).

At 506, the totes are transported from a first location to a second location while at least some of the items are in the totes. The first location may be, for example, a supplier facility or merchant material handling facility. Transportation may be by truck, semi trailer, air, rail, or any other shipment method. In one embodiment, stacked, cross-coupled totes with items are transported in a semi trailer.

The second location may be, for example, a holiday fulfillment center. At a fulfillment center, shelving system two totes deep by N totes wide (for example, 7 totes wide) may be placed on the floor of a room in the fulfillment center. In one embodiment, several shelving systems are distributed at a fulfillment center. In one embodiment, each shelving system is two totes deep with lateral access to the totes on both the front and back of the system (for example, as shown in FIG. 1). In one embodiment, 4-foot wide aisles are provided between each shelving system.

In some embodiments, totes of a system are stacked and cross coupled to one another before being transported to the second location. In certain embodiments, pallets are used to transport the stacked and cross coupled totes while the items are in the totes.

At 508, while the totes are stacked, items are removed from the totes through the lateral openings in the totes. Items may be removed, for example, in response to receiving an order from a customer (for example, as described above relative to FIG. 19).

In certain embodiments, empty totes may be provided to a supplier of items to be stored. The supplier may load the totes with the items and ship the items to retail merchant. The retail merchant may receive the totes from the supplier and distribute the totes at a fulfillment center.

Figure 21:
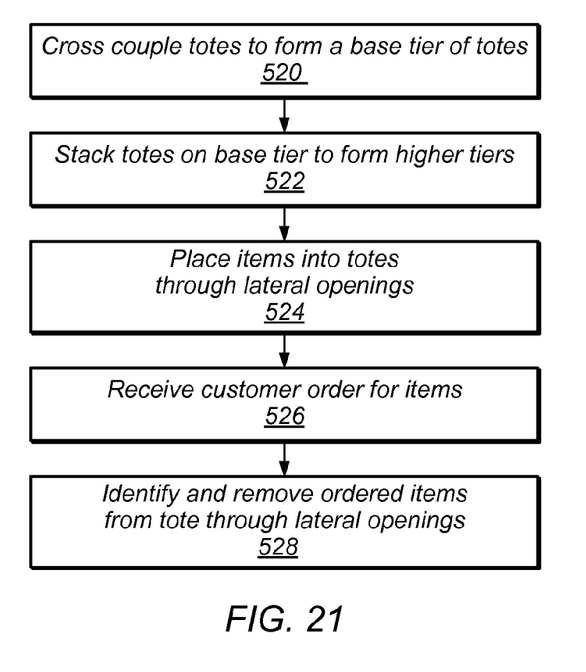
FIG. 21 illustrates one embodiment of making a shelving system with stacked totes.

In an embodiment, a method of making shelving for holding items includes cross coupling and stacking totes such that items can be removed from lateral openings in the totes. FIG. 21 illustrates one embodiment of making a shelving system with stacked totes. At 520, two or more totes are cross coupled to form a base tier of totes. The totes may include lateral openings. In some embodiments, the shelving systems are constructed at a temporary inventory storage location in response to identifying a requirement to expand a merchant's or distributor's inventory storage (for example, to handle increased orders during a holiday season).

At 522, totes are stacked on the base tier to form at least one higher tier of totes. The totes may be stacked such that items can be placed into the totes through the lateral openings. In some embodiments, lids are placed on totes of the uppermost tier of a system.

At 524, items are placed into the totes. At 526, a customer order is received for one or more items in the totes (for example, as described above relative to FIG. 19). At 528, the item is identified and removed from the tote in response to the order.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for holding items, comprising:
a base tier comprising two or more totes; and
one or more higher tiers stacked on the base tier, each of at least one of the higher tiers comprising one or more totes stacked on one or more totes of at least one lower tier,
wherein each of the totes comprised in the base tier and the one or more higher tiers comprises a top opening, a bottom base, and a plurality of lateral faces, at least two of the lateral faces having a lateral opening and at least one coupling portion, wherein at least one of the lateral openings is configured to allow removal of items from the bottom base of the tote through the lateral opening while the tote is stacked in place in one of the tiers,
wherein at least two of the totes are configured to laterally cross couple to each other, at respective coupling portions of respective lateral faces having respective lateral openings; and
at least two dividers each comprising a front wall and a rear wall and configured to couple with a separate lateral opening of a lateral face of a separate tote of the at least two totes which are cross coupled to each other via coupling of respective lateral faces including the separate lateral openings, based at least in part upon:
a downward sliding engagement between at least one vertical rail extending along a side of the respective divider and at least one slot extending along a side of the respective separate lateral opening to bottom out the vertical rail on a bottom of the respective lateral opening, and
a downward sliding engagement between at least one post at a top side edge of the respective divider located above the at least one vertical rail extending along the respective side, wherein the at least one post projects towards the rear wall of the respective divider, and a socket in a top of the respective lateral face proximate to the respective lateral opening, wherein the socket is positioned towards an interior of the respective tote, such that the respective divider is restricted to coupling with the respective lateral opening in an orientation where the rear wall faces towards the interior of the respective tote when a top surface of the at least one post lies flush with a top surface of the socket;
the at least two dividers are each configured to lie flush with top and side portions of the respective lateral face including the respective lateral opening to which the respective divider is coupled;
the at least two dividers are each configured to lie in flush lateral contact with each other, at limited top portions of the at least two dividers, when the at least two dividers are coupled to the respective lateral openings of coupled lateral faces of the at least two separate totes; and
each divider is configured to restrict removal of items from the bottom base of the separate tote coupled thereto, such that:
lateral removal of items from the bottom base of one of the cross-coupled totes is restricted to the lateral openings of the lateral faces of the totes that are not cross-coupled;
wherein an upper tote of the totes in at least one of the upper tiers is nestable within a lower tote of the totes when the upper tote is placed in a first orientation with respect to the lower tote and stackable on the lower tote when the upper tote is placed in a second orientation with respect to the lower tote.

2. The system of claim 1, wherein the base tier comprises an array at least two totes wide by at least two totes deep.

3. The system of claim 1, wherein the at least two of the totes are laterally cross coupled side-to-side.

4. The system of claim 1, wherein the at least two of the totes are laterally cross coupled front-to-back.

5. The system of claim 1, wherein the at least two of the coupling portions comprise interlocking elements.

6. The system of claim 1, wherein at least one lateral opening comprised in the one or more totes of at least one lower tier is configured to allow removal of at least one item in the one or more totes without removing totes in an uppermost tier.

7. The system of claim 1, wherein the base tier comprises an array of at least two totes by two totes, wherein at least four of the totes are cross coupled to one another at a common junction.

8. The system of claim 1, further comprising at least one lid on at least one tote on the uppermost tier of the system.

9. The system of claim 1, wherein at least of the totes on at least one a first one of the tiers is coupled to at least one tote of a lower tier to inhibit separation of the first tier from the lower tier.

10. The system of claim 1, wherein at least a first one of the higher tiers comprises two or more totes, wherein at least two of the totes in the first higher tiers are laterally cross coupled to one another.

11. The system of claim 1, wherein:
each of the totes comprises a rim including a hole projecting through the rim to an underside of the rim; and
the system further comprising at least one coupling device that is separate from the totes, wherein the coupling device is configured to laterally cross couple at least one of the totes with at least three other of the totes such that a particular corner of the at least one of the totes is adjacent to at least one corner of each of the at least three other of the totes, the at least one coupling device comprising:
at least four pins that each include a protrusion and are each configured to pass through separate holes of separate totes of the totes such that each protrusion snaps into engagement on an underside of a separate rim of each separate tote.

12. The system of claim 1, further comprising one or more pallets, wherein at least one of the pallets is configured to support at least a portion of the totes of the base tier such that the totes of the system can be moved from one place to another on the pallet.

13. A tote for holding items, comprising:
one or more item-holding portions configured to hold one or more items;
a plurality of lateral faces, at least one of the lateral faces comprising:
one or more coupling portions configured to laterally cross-couple the lateral face of the tote with at least one other tote; and
one or more lateral openings configured to allow removal of items from the tote through at least one of the lateral openings; and
at least one nesting stop element protruding from at least one of the lateral faces into the one or more item-holding portions;
wherein at least one of the coupling portions is configured to cross couple at least one lateral face of the tote with at least one other lateral face of the at least one other tote, each of the at least one lateral face and the at least one other lateral faces having matching lateral openings; and
at least one divider configured to couple with a lateral opening of the at least one lateral face of the tote that is laterally cross-coupled with the at least one other face of the at least one other tote, wherein:
the divider is configured to couple with the lateral opening based at least in part upon:
a downward sliding engagement between at least one vertical rail extending along a side of the divider and at least one slot extending along a side of the lateral opening to bottom out the vertical rail on a bottom of the lateral opening, and
a downward sliding engagement between at least one post at a top side edge of the divider, the post being located above the at least one vertical rail extending along the side, and a socket in a top of the lateral face proximate to the lateral opening, such that a to surface of the at least one post lies flush with a top surface of the socket;
the divider is configured to lie flush with the top and side portions of the lateral face;
the divider is configured to lie in flush lateral contact, at a limited top portion of the divider, with a top portion of another divider coupled with the at least one other lateral opening of the at least one other face of the at least one other tote to which the tote is laterally cross-coupled, when the divider is coupled with the lateral opening of the tote; and
the divider is configured to partition the one or more item holding portions in the tote from another one or more item holding portions in the at least one other tote to which the lateral face of the tote is laterally cross-coupled, such that:
lateral removal of items from the one or more item holding portions in the tote is restricted to removal via another lateral opening of the tote, which is not laterally cross-coupled with the at least one other tote, and
lateral removal of items from the one or more item holding portions in the tote via the lateral opening of the at least one other tote is precluded;
wherein the tote is configured to nest with another tote when the tote is placed in a first orientation with respect to the other tote and is configured to stack on the other tote when the tote is placed in a second orientation with respect to the other tote.

14. The tote of claim 13, wherein the at least one of the coupling portions is configured to interlock with an element of the at least one other tote.

15. The tote of claim 14, wherein the at least one of the coupling portions comprises a dovetail socket and the element comprises an interlocking tail.

16. The tote of claim 14, wherein the at least one of the coupling portions comprises a tail and the element comprises an interlocking dovetail socket.

17. The tote of claim 13, comprising:
a plurality of bin labels located on separate sides of the tote, each bin label identifying a separate one of a plurality of systems of totes that includes the tote and configurable to be changed based at least in part upon a present location of the tote in a fulfillment center; and
a tote label, separate from the bin labels, that uniquely identifies the tote with respect to other totes in the plurality of systems of totes.

18. The tote of claim 13, wherein the tote is switchable from a stacking arrangement with the at least one other tote to a nesting arrangement with the at least one other tote by rotating the tote about a vertical axis relative the at least one other tote.

19. The tote of claim 13, further comprising at least one removable wall.

20. The tote of claim 13, further comprising at least one opening on each of at least two opposing sides of the tote, wherein the openings are configured to allow removal of at least one item in the tote.

* * * * *